United States Patent [19]

Sumiya et al.

[11] Patent Number: 5,698,308
[45] Date of Patent: Dec. 16, 1997

[54] POLYESTER FILM FOR USE OF A LAMINATE WITH A METAL PLATE

[75] Inventors: Takashi Sumiya, Anpachi-gun; Iwao Tanaka, Hikone; Kunio Shibatsuji, Kusatsu; Hirokazu Kurome, Anpachi-gun; Seiya Sugiura, Takatsuki; Wataru Ooe, Otsu, all of Japan

[73] Assignee: Toray Industries, Inc., Japan

[21] Appl. No.: 623,928

[22] Filed: Mar. 28, 1996

Related U.S. Application Data

[62] Division of Ser. No. 452,585, May 25, 1995, Pat. No. 5,591,518.

[30] Foreign Application Priority Data

Dec. 16, 1994 [JP] Japan ............... HEI 6-334210
Dec. 16, 1994 [JP] Japan ............... HEI 6-334211

[51] Int. Cl.$^6$ ............................................. B32B 3/26
[52] U.S. Cl. ..................... 428/317.9; 428/480; 521/182
[58] Field of Search ..................... 428/317.9, 480; 521/182

[56] References Cited

U.S. PATENT DOCUMENTS 5,372,867 12/1994 Hasegawa et al. ............... 428/141

FOREIGN PATENT DOCUMENTS

| 4-151245 | 5/1992 | Japan . |
| HEI 5-170942 | 7/1993 | Japan . |
| HEI 5-287090 | 11/1993 | Japan . |
| HEI 5-331301 | 12/1993 | Japan . |
| HEI 5-339391 | 12/1993 | Japan . |
| HEI 6-218895 | 8/1994 | Japan . |
| HEI 6-271686 | 9/1994 | Japan . |

OTHER PUBLICATIONS

The English translation of JP6-218895, 1994.
The English translation of JP6-271686, 1994.
The English translation of JP5-331301, 1992.
The English translation of JP5-287090, 1992.
The English translation of JP5-170942, 1993.
The English translation of JP5-339391, 1992.

*Primary Examiner*—Kathleen Choi
*Attorney, Agent, or Firm*—Austin R. Miller

[57] ABSTRACT

Disclosed is a polyester film for use of a laminate with a metal plate comprising a polyester=group resin containing a white pigment having a mean particle diameter of 0.01 to 1.8 μm at a content of 10 to 30% by weight. The film has (a) a void ratio of 4 to 30%, (b) a melting peak temperature of 150° to 245° C., (c) an amount of oligomer of not more than 3% by weight and (d) an orientation degree of 0.7 to 4.0. When the film is laminated on a metal, it can indicate excellent light interruptive property, lamination property, forming property and processing property.

4 Claims, No Drawings

POLYESTER FILM FOR USE OF A LAMINATE WITH A METAL PLATE

This application is a divisional of application Ser. No. 08/452,585, filed May 25, 1995, now U.S. Pat. No. 5,591,518.

BACKGROUND OF THE INVENTION

1. Field of the Invention

The present invention relates to a white polyester film for use of a laminate with a metal plate excellent in heat resistance, wet heat resistance and forming property, and more specifically to a white polyester film suitable to use for forming after heat bonding it to a metal.

2. Description of the Related Art

Various white polyester films have been known. For example, (A) a film wherein copolymerization components are controlled in the range of 2 to 50 mol % and inorganic additives are added at a content of 1 to 20% by weight (for example, JP-A-SHO 52-13542), (B) a film wherein the heat of crystalline melting is suppressed not more than 6.0 cal/g and white inorganic particles are added at a content of 5 to 30% by weight (for example, JP-A-HEI 1-241492), and (C) a film added with particles having a particle diameter of 0.1 to 25 μm by a number of about $1 \times 10^8/\text{mm}^3$ whose melting point is in the range of 210° to 245° C. (for example, JP-A-HEI 5-170942), are known. In such white films of the above-described (A), (B) and (C), however, because the heat resistance and the wet heat resistance thereof are poor, they cannot be sufficiently served to practical uses, particularly to uses wherein the films are heat bonded and formed and thereafter the metal-film laminates are heated.

SUMMARY OF THE INVENTION

Accordingly, an object of the present invention is to provide a white polyester film for use of a laminate with a metal plate which is excellent in heat resistance and wet heat resistance and which is less in soil caused in processing and excellent in forming property.

To accomplish the above object, a polyester film for use of a laminate with a metal plate according to the present invention comprises a polyester-group resin containing a white pigment having a mean particle diameter of 0.01 to 1.8 μm at a content of 10 to 30% by weight. The film has (a) a void ratio of 4 to 30%, (b) a melting peak temperature of 150° to 245° C., (c) an amount of oligomer of not more than 3% by weight and (d) an orientation degree of 0.7 to 4.0.

Further, the polyester film according to the present invention may be formed as a laminated film of layers A and B. Namely, a polyester film for use of a laminate with a metal plate according to the present invention comprises (i) a layer B comprising a polyester-group resin containing a white pigment having a mean particle diameter of 0.01 to 1.8 μm at a content of 10 to 30% by weight, the layer B having (a) a void ratio of 4 to 30%, (b) a melting peak temperature of 150° to 245° C., (c) an amount of oligomer "$O_B$" of not more than 3% by weight and (d) an orientation degree of 0.7 to 4.0; and (ii) a layer A laminated on the layer B, the layer A comprising a polyester-group resin containing a white pigment at a content of 10 to 30% by weight, the layer A having an amount of oligomer "$O_A$" (% by weight) satisfying the equation:

$$O_A < (O_B - 0.2)$$

A metal-film laminate is made by heat bonding such a white polyester film to a metal plate, in a case of a single layer film, by directly heat bonding the film to a metal plate, and in a case of a laminated film, by heat bonding the layer B to a metal plate.

In such a white polyester film, in uses wherein a metal-film laminate is formed after the film is heat bonded to a metal, excellent light interruptive property, lamination property, forming property and processing property (less soil, less oligomer) as well as excellent heat resistance and wet heat resistance can be achieved.

DETAILED DESCRIPTION OF THE PREFERRED EMBODIMENTS

Further objects, features, and advantages of the present invention will be understood from the detailed description of the preferred embodiments of the present invention.

In the polyester-group resin forming the white polyester film according to the present invention, as the acid component, for example, an aromatic dicarboxylic acid such as terephthalic acid, isophthalic acid and naphthalene dicarboxylic acid and an aliphatic dicarboxylic acid such as adipic acid, azelaic acid, sebacic acid and decanedicarboxylic acid can be used. As the alcohol component, for example, an aliphatic diol such as ethylene glycol, diethylene glycol, butanediol and hexanediol and a cycloaliphatic diol such as cyclohexanedimethanol can be employed.

In order to improve the forming property and heat bonding property in such a polyester-group resin, it is preferred that the sum of an aliphatic acid component and an alcohol component whose carbon numbers are not less than 4 is suppressed not more than 5.0 mol %, preferably not more than 1.5 mol %, more preferably not more than 0.8 mol %. If the sum is more than 5.0 mol %, the heat resistance and the wet heat resistance of the white polyester film tend to deteriorate. Further, in the above, it is further preferred that the sum of an aliphatic acid component and an alcohol component whose carbon numbers are not less than 3 is suppressed not more than 3.0 mol %.

In the film according to the present invention, a white pigment having a mean particle diameter of 0.01 to 1.8 μm is added at a content of 10 to 30% by weight. If the content is less than 10% by weight, a desired whitening becomes difficult, and if the content is more than 30% by weight, although the aimed whitening can be achieved, the forming property deteriorates as well as the film becomes fragile because of the too much content. As a typical white pigment, titanium oxide, barium titanate, barium sulfate and calcium carbonate particles can be used.

Particularly, as such a white pigment, titanium oxide particles having a mean particle diameter of 0.1 to 1.2 μm and a loss on drying of not more than 0.8% are preferred. Such titanium oxide particles are added at a content of 10 to 30% by weight to form a white polyester film. The mean particle diameter of the titanium oxide particles is preferred in the range of 0.1 to 1.2 μm from the viewpoint of achieving a desired whitening while ensuring a desired forming property.

As the titanium oxide particles, for example, rutile type, bruckite type and anatase type titanium oxide particles can be used. Particularly, rutile type titanium oxide particles conducted an organic treatment such as silane treatment (silane coupling agent treatment) or polyfunctional alcohol treatment is effective to achieve the above-described range of loss on drying.

The loss on drying of the particles in the present invention was determined based on JIS-K5101 under a condition of a sample weight of 2 g. In JIS-K5101, a sample of a pigment (particles) is heated in a dryer at a temperature of 105° C.±2° C. for two hours, and the loss on drying "W" (%) is calculated by the following equation.

$$W=[(m_0-m_1)/m_0]\times 100$$

Where, "$m_0$" represents the weight of a sample before heated and "$m_1$" represents the weight of the sample after heated.

In the determination, the loss on drying is preferred to be not more than 0.8%. If the loss on drying is more than 0.8%, the heat resistance and the wet heat resistance deteriorate. In order to control the loss on drying to not more than 0.8%, it is effective to perform a surface treatment on the titanium oxide particles. For example, the following treatments are effective.

① treatment by silane coupling agent or isopropyltitanate
② hydrophobic treatment by an organic compound after treatment by two or more kinds of hydrate oxides In the film according to the present invention, the void ratio must be controlled in the range of 4 to 30%. Although the void ratio might be lower than the above-described range from the viewpoint of only voids, if the void ratio is lower than the above-described range, the amount of oligomer precipitated on the film surface increases and it is not preferred. On the other hand, if the void ratio is higher than the above-described range, the film becomes fragile and it becomes difficult to obtain mechanical properties such as strength required to the film.

The white polyester film according to the present invention must have a melting peak temperature of 150° to 245° C. The melting peak temperature is preferably in the range of 180° to 230° C. If the melting peak temperature is lower than 150° C., a sufficiently high heat resistance cannot be obtained. If the melting peak temperature is higher than 245° C., the forming property and the bonding property become poor. Where, the melting peak temperature is determined by using a differential scanning calorimeter (DSC) produced by Perkin Elmer Corporation and measuring it at a temperature elevation speed of 10° C./min.

In the film according to the present invention, if a component having a molecular weight of not more than 2,000 is present by a content of not less than 1.5% by weight, the advantages according to the present invention become further remarkable.

Further, in the film according to the present invention, the amount of oligomer must be not more than 3% by weight. The amount of oligomer is preferably not more than 1.5% by weight, more preferably not more than 1.0% by weight from the viewpoint of process stability. If the amount of oligomer is more than 3% by weight, when the film is subjected to a process for a long period of time, oligomer is likely to precipitate on the film surface and soil the film surface. Therefore, the film is applied to, for example, cans for foods, the oligomer enters into foods stored in the cans from some reasons and various troubles such as soil of the foods may occur because.

The film according to the present invention may be formed as a laminated film of a layer A and a layer B. The layer B is composed of the above-described film. The layer A is composed of a polyester-group resin containing a white pigment at a content of 10 to 30% by weight, and the amount of oligomer of the layer A is suppressed small, that is, so as to satisfy the equation:

$$O_A<(O_B-0.2).$$

Where, $O_A$: amount of oligomer of layer A (% by weight)
$O_B$: amount of oligomer of layer B (% by weight).

When a metal-film laminate is formed using such a laminated film having layers A and B, the layer B is heat bonded to the metal and the layer A is placed opposite to the metal. In such a laminated film having layers A and B, a mixture of two or more kinds of polyesters having intrinsic viscosities different to each other can be used as the resin for the layer B. For example, a mixture of a virgin raw material and a recycled raw material can be used. Even if the amount of oligomer in the layer B becomes relatively great, because the layer B is covered with the layer A having a less amount of oligomer, the precipitation of oligomer particularly to the film surface of the layer A side can be suppressed small. Therefore, troubles accompanying with precipitation of oligomer can be prevented in various processes, and the precipitation of oligomer to the outer surface of the film after lamination with a metal plate can be suppressed small. Namely, a recycled raw material having a relatively large amount of oligomer can be effectively re-used. Where, the above-described intrinsic viscosity is determined at a temperature of 25° C. using o-chlorophenol.

In the film according to the present invention, the orientation degree must be in the range of 0.7 to 4.0. If the orientation degree is lower than 0.7, the lamination property slightly deteriorates. If the orientation degree is higher than 4.0, the forming property slightly deteriorates.

Although the film according to the present invention may be a uniaxially stretched film, a biaxially stretched film is preferred from the viewpoint of strength, durability, strength after forming, etc. In a case of a laminated film of layers A and B, although the thicknesses of the layers A and B are not particularly restricted, the thickness ratio of the layers A and B (layer A/layer B) is preferably in the range of 1/100 to 100/1. Further, the thickness of the layer A is preferably controlled in the range of 1.0 to 10 μm for effectively suppressing the precipitation of oligomer in a process.

Further, in the white polyester film according to the present invention, the surface glossiness is preferably in the range of 20 to 70% and the optical density at a thickness of 20 μm is preferably in the range of 0.2 to 0.6 particularly from the viewpoint of printing appearance in use of a laminate with a metal. Where, the optical density represents a degree of opacity of the film, and it is defined by determining the ratio of an intensity of an incident light ($I_O$) to an intensity of a transmitted light (I) as "$\log(I_O/I)$".

Particularly in a case of a laminated film of layers A and B, the content of the white pigment of the layer B may be less than the content of the white pigment in the layer A.

In the preparation of the polyester-group resin according to the present invention, a catalyst of the transesterification thereof such as Ca, Li, Mn, Zn or Ti can be used. Alternatively, terephthalic acid may be directly transesterified. As the polymerization catalyst, $Sb_2O_1$ or germanium oxide can be used. Further, as needed, other additives, for example, fluorescent whitening agent, anti-oxidant, thermal stabilizer, ultraviolet absorbent or antistatic agent may be added at a regular amount unless the objects and advantages of the present invention are damaged. Particularly, it is preferred that an anti-oxidant is added, because the wet heat resistance can be further improved.

Next, a typical method for producing the polyester film according to the present invention will be explained. However, the present invention is not particularly restricted by the following method.

The polyester-group resin added with titanium oxide particles and other various additives is molten and delivered out from a die to be cooled and formed in a form of a sheet. In a case of a two-layer laminated film, two kinds of polyester-group resins are molten by two extruders, respectively, the molten polymers are laminated in a feed block for lamination or a die for lamination, and the laminated polymers are delivered out from a die to be cooled and formed in a form of a sheet. In a case where the formed sheet is stretched uniaxially or biaxially, the longitudinal stretching temperature is preferably in the range of 60° to 120° C., the longitudinal stretching draw ratio is preferably in the range of 2.6 to 5.5 times, and the transverse stretching temperature is preferably in the range of 70° to 160° C., the transverse stretching draw ratio is preferably in the range of 2.6 to 5.0 times. The thermosetting is conducted preferably at a temperature of 110° to 240° C. and a relax ratio of 0 to 10%.

The titanium oxide particles may be added either at the time of polymerization or at the time of film formation by mixing and dispersing the particles in the molten polymer. Alternatively, a method for preparing a high-concentration master pellets and diluting the master pellets may be employed.

The white polyester film thus formed is heat bonded to a metal plate or a metal sheet by a regular method to form a metal-film laminate.

As a typical metal plate laminated with the film according to the present invention, a tin plate, a tin-free steel or aluminum plate can be used. The surface of these metal plates may be appropriately treated by organic or inorganic compound.

Next, the methods for determining the characteristics in the present invention and estimating the effects according to the present invention will be explained.

(1) Void Ratio (%)

Amount of addition of white pigment/specific gravity of the white pigment+[(1–the amount of addition of the white pigment)/specific gravity of polyester portion]=1/δ was calculated. Using the calculated "δ", the void ratio was defined by the following equation.

Void ratio=[1–(specific gravity of film/δ)]×100 (%)

Where, it was regarded that the polyester portions were all crystallized, and 1.515 was used as the value of the specific gravity.

(2) Melting Peak Temperature

Using a differential scanning calorimeter (DSC) produced by Perkin Elmer Corporation, the melting peak temperature was determined under a condition of a heating speed of 10° C./min. and an amount of sample of 10 mg.

(3) Amount of Oligomer (% by weight)

A filtrated solution was prepared by dissolving and depositing a sample using hexafluoroisopropanol/acetone. Using a gel osmotic chromatography (GPC244, produced by Waters Corporation), the amount of ring trimer in the solution was determined at a detecting wave length of 254 nm, using chloroform (1 ml/min.) as a solvent. The determined amount of ring trimer was defined as the amount of oligomer.

(4) Orientation Degree

The following Fourier-transformation infrared spectrophotometer (FT-IR) was used.

Measuring apparatus:
  FTS-15E/D (FT-IR produced by Bio Rad Digilab Corporation)
Light source:
  Special ceramic detector "MCT"
Attached apparatus:
  Micro-ATR measuring attachment (produced by Wilks Corporation)

incident angle: 45 degrees
IRE: KRS-5, using a polarizer
Measuring conditions:
  resolution: 4 $cm^{-1}$
  cumulative times: 500 times The ratio of absorption of light having a frequency of 970 $cm^{-1}$ due to ν C—O transband to absorption of light having a frequency of 790 $cm^{-1}$ due to benzene ring was determined and this was defined as the orientation degree.

(5) Mean Particle Diameter

After dissolving a polyester-group resin and separating particles from the resin, the mean particle diameter of the particles were determined in a solvent of ethanol using a decanter (CAPA-500, produced by Horiba Seisakusho Corporation).

(6) Light Interruptive Property

A film sample having a thickness of 15 µm was prepared, and the light interruptive property was determined by optical density based on JIS-K7605. In JIS-K7605, an illumination light is radiated uniformly on a circlular area of the sample having a diameter of 1 mm or more. The optical density is determined by the following equation.

Optical density=$\log_{10}(F_0/F)$

Where, "F" represents the amount of the light transmitted through the measuring area (the circular area) of the sample and measured by a light receiver among the light radiated onto the sample, and "$F_0$" represents the amount of the transmitted light determined in the same condition when the sample is removed.

The light interruptive property was determined by the following ranks.
  ○: Optical density/thickness (µm) is not less than 0.031.
  Δ: Optical density/thickness (µm) is less than 0.031 and not less than 0.026.
  X: Optical density/thickness (µm) is less than 0.026.

Rank "○" and rank "Δ" were determined to be able to be served to practical uses.

(7) Lamination Property

After a film sample was laminated on a tin-free steel having a thickness of 0.3 mm heated at a temperature of a melting peak temperature (in a case where two or more peaks are present, arithmetic mean determined using melting energy ratio) plus 8° C., the metal-film laminate was rapidly cooled, and after dry treated at a temperature of 210° C. for five minutes, a weight of 250g was dropped onto the metal-film laminate from a height of 6 cm to provide an impact. Thereafter, the sample was put in a 1% NaCl water, a voltage of 6V was applied, and a condition of the electric current of not more than 0.2 mA was determined to be good "○" and the other conditions were determined to be not good "X".

(8) Forming Property

After the film sample was laminated in the same manner as in the above (7), the metal-film laminate was formed by drawing at a draw ratio of 1.37 times. The formed metal-film laminate was then dry treated at a temperature of 210° C. for ten minutes. The conditions where the film was delaminated from the metal, the film was whitened by deformation or delamination or the edge of the film was remarkably shrinked were determined to be not good "X", and the other conditions were were determined to be good "○".

(9) Processing Property (stability in a process)

After the film sample was laminated in the same manner as in the above (7), the metal-film laminate was dry treated at a temperature of 160° C. for two hours (in a case of melting peak temperature of not higher than 170° C., at a temperature of [the melting peak temperature—10° C.]). The sample was washed by isopropyl alcohol, and the amount of oligomer precipitated on the film surface was determined. The condition where the amount of precipitated oligomer was more than ⅓ of the amount of contained oligomer or the amount of precipitated oligomer was more than 2% by weight was determined to be not good "X", and the condition where the amount of precipitated oligomer was not more than ⅓ of the amount of contained oligomer or the amount of precipitated oligomer was not more than 2% by weight was determined to be good "○". The condition where the amount of precipitated oligomer satisfied the level of rank "○" but the amount was in the range of 75 to 100% of the upper limit specified by the present invention was determined to be "Δ".

EXAMPLES AND COMPARATIVE EXAMPLES

Preferred examples will be hereinafter explained together with comparative examples. The results of these examples and comparative examples are shown in Tables 1 to 6.

Example 1

As shown in Table 1, a polyester-group resin whose acid component was composed of terephthalic acid (TPA) and isophthalic acid (IPA) and whose alcohol component was composed of ethylene glycol (EG) and diethylene glycol (DEG) was prepared by solid phase polymerization, and rutile type titanium dioxide particles (white pigment) having a mean particle diameter of 0.4 μm whose loss on drying was controlled to 0.4% by providing silane treatment to the surfaces were added to the resin at a content of 16% by weight. The resin was supplied to an extruder and molten and extruded at a temperature of 280° C. (Table 6), and the molten polymer was delivered out from a die in a form of a sheet. The polymer sheet was cast onto a cooling drum and cooled and solidified to form a sheet. The non-stretched sheet was stretched in the longitudinal direction at a temperature of 102° C. and a draw ratio of 3.0 times, and thereafter, the uniaxially stretched film was stretched in the transverse direction at a temperature of 110° C. and a draw ratio of 3.1 times, and then the biaxially stretched film was heat treated at a temperature of 190° C. and a relax of 1.0% to form a biaxially oriented polyester film having a thickness of 15 μm (Table 6). The film thus prepared was laminated on a tin-free steel plate having a thickness of 0.4 mm at a temperature of 240° C., and the obtained metal-film laminate was determined. The resulted data are shown in Tables 1, 2 and 6.

Examples 2–4, Comparative Examples 1–5

Conditions were changed as shown in Tables 1 and 6. The characteristics of the films prepared and the metal-film laminates obtained are shown in Tables 1 and 2.

Where, with respect to loss on drying of the pigment, the loss on drying due to silane treatment was 0.4%, the loss on drying due to alcohol treatment was 0.7% and the loss on drying with no treatment was 1.4%.

Examples 5–10, Comparative Examples 6–8

In these Examples and Comparative Examples, recycled raw material was used at a content of 40% by weight for forming the layer B, and the film was formed as a laminated film of layers A and B. Conditions were as shown in Tables 3, 4, 5 and 6. The characteristics of the films prepared and the metal-film laminates obtained are shown in Tables 3, 4 and 5.

As shown in Tables 1 to 5, the films and the metal-film laminates within the ranges according to the present invention indicated excellent light interruptive properties, lamination properties, forming properties and processing properties, but those out of the ranges specified by the present invention could not indicate such excellent properties.

TABLE 1

| | | | | | | | Layer B | | | | |
|---|---|---|---|---|---|---|---|---|---|---|---|
| | | Pigment | | | | | | | Polymer composition | | Melting peak |
| | Kind | Surface treatment | Mean particle diameter (μm) | Content (wt %) | Amount of oligomer (wt %) | Solid phase polymerization | Orientation degree | acid component (mol %) | alcohol component (mol %) | temperature (°C.) |
| Example 1 | rutile type titanium dioxide | silane treatment | 0.4 | 16 | 0.90 | present | 1.5 | TPA: 88 IPA: 12 | EG: 99 DEG: 1 | 228 |
| Example 2 | rutile type titanium dioxide | silane treatment | 0.4 | 22 | 0.92 | present | 1.5 | TPA: 88 IPA: 12 | EG: 99 DEG: 1 | 228 |
| Comparative Example 1 | rutile type titanium dioxide | silane treatment | 0.4 | 35 | 1.0 | present | 1.5 | TPA: 88 IPA: 12 | EG: 99 DEG: 1 | 228 |
| Comparative Example 2 | rutile type titanium dioxide | silane treatment | 0.4 | 16 | 3.4 | present | 1.82 | TPA: 100 | EG: 99.5 DEG: 0.5 | 262 |
| Comparative Example 3 | rutile type titanium dioxide | silane treatment | 0.4 | 4 | 0.93 | present | 2.4 | TPA: 88 IPA: 12 | EG: 99 DEG: 1 | 228 |
| Comparative Example 4 | rutile type titanium dioxide | none | 0.4 | 8 | 3.4 | none | 1.5 | TPA: 88 IPA: 12 | EG: 99 DEG: 1 | 228 |
| Comparative Example 5 | rutile type titanium dioxide | none | 0.4 | 8 | 3.3 | none | 0.2 | TPA: 88 IPA: 12 | EG: 99 DEG: 1 | 228 |
| Example 3 | rutile type titanium dioxide | silane treatment | 0.4 | 16 | 0.88 | present | 1.35 | TPA: 75 IPA: 25 | EG: 99 DEG: 1 | 185 |
| Example 4 | rutile type titanium dioxide | alcohol treatment | 0.4 | 16 | 0.87 | present | 1.33 | TPA: 88 IPA: 12 | EG: 99 DEG: 1 | 228 |

TABLE 2

| | Light interruptive property | Void ratio (%) | Lamination property | Forming property | Processing property |
|---|---|---|---|---|---|
| Example 1 | o | 9 | o | o | o |
| Example 2 | o | 11.5 | o | o | o |
| Comparative Example 1 | o | 21.2 | x | x | o |
| Comparative Example 2 | o | 9 | x | x | o |
| Comparative Example 3 | x | 3.1 | x | x | o |
| Comparative Example 4 | x | 5.6 | x | x | x |
| Comparative Example 5 | x | 6.8 | o | x | x |
| Example 3 | o | 8.6 | o | o | o |
| Example 4 | o | 20.9 | o | o | o |

TABLE 3

| | Layer B | | | | | | | |
|---|---|---|---|---|---|---|---|---|
| | Pigment | | | | | | Polymer composition | |
| | Kind | Surface treatment | Mean particle diameter (μm) | Content (wt %) | Amount of oligomer (wt %) | Solid phase polymerization | Orientation degree | acid component (mol %) | alcohol component (mol %) |
| Example 5 | rutile type titanium dioxide | silane treatment | 0.45 | 16 | 2.8 | none | 1.44 | TPA: 88 IPA: 12 | EG: 99 DEG: 1 |
| Example 6 | rutile type titanium dioxide | silane treatment | 0.45 | 16 | 2.8 | none | 1.44 | TPA: 88 IPA: 12 | EG: 99 DEG: 1 |
| Example 7 | rutile type titanium dioxide | silane treatment | 0.45 | 16 | 2.8 | none | 1.44 | TPA: 88 IPA: 12 | EG: 99 DEG: 1 |
| Example 8 | rutile type titanium dioxide | none | 0.45 | 16 | 2.8 | none | 1.44 | TPA: 88 IPA: 12 | EG: 99 DEG: 1 |
| Example 9 | rutile type titanium dioxide | none | 0.45 | 25 | 2.8 | none | 1.44 | TPA: 88 IPA: 12 | EG: 99 DEG: 1 |
| Comparative Example 6 | rutile type titanium dioxide | silane treatment | 0.45 | 16 | 2.8 | none | 0.6 | TPA: 88 IPA: 12 | EG: 99 DEG: 1 |
| Comparative Example 7 | rutile type titanium dioxide | silane treatment | 0.45 | 16 | 2.8 | none | 4.1 | TPA: 88 IPA: 12 | EG: 99 DEG: 1 |
| Example 10 | calcium carbonate | phosphate treatment | 1.0 | 22 | 2.8 | none | 1.44 | TPA: 88 IPA: 12 | EG: 99 DEG: 1 |
| Comparative Example 8 | rutile type titanium dioxide | silane treatment | 2.0 | 16 | 2.8 | none | 1.44 | TPA: 88 IPA: 25 | EG: 99 DEG: 1 |

TABLE 4

| | Layer B | | | | | | | |
|---|---|---|---|---|---|---|---|---|
| | Pigment | | | | | | Polymer composition | |
| | Kind | Surface treatment | Mean particle diameter (μm) | Content (wt %) | Amount of oligomer (wt %) | Solid phase polymerization | Orientation degree | acid component (mol %) | alcohol component (mol %) |
| Example 5 | rutile type titanium dioxide | silane treatment | 0.45 | 20 | 0.85 | present | 1.48 | TPA: 88 IPA: 12 | EG: 99 DEG: 1 |
| Example 6 | rutile type titanium dioxide | silane treatment | 0.45 | 20 | 0.85 | present | 1.48 | TPA: 88 IPA: 12 | EG: 99 DEG: 1 |
| Example 7 | rutile type titanium dioxide | silane treatment | 0.45 | 25 | 0.85 | present | 1.48 | TPA: 88 IPA: 12 | EG: 99 DEG: 1 |
| Example 8 | | | | | | none | | | |
| Example 9 | | | | | | none | | | |
| Comparative Example 6 | rutile type titanium dioxide | none | 0.45 | 20 | 0.85 | present | 0.63 | TPA: 86 IPA: 14 | EG: 99 DEG: 1 |
| Comparative | rutile type | none | 0.45 | 20 | 0.85 | present | 4.3 | TPA: 86 | EG: 99 |

TABLE 4-continued

| | Layer B | | | | | | | |
|---|---|---|---|---|---|---|---|---|
| | Pigment | | | | | | Polymer composition | |
| | | | Mean particle | | Amount of | Solid | | acid | alcohol |
| | Kind | Surface treatment | diameter (μm) | Content (wt %) | oligomer (wt %) | phase polymerization | Orientation degree | component (mol %) | component (mol %) |
| Example 7 | titanium dioxide | | | | | | | IPA: 14 | DEG: 1 |
| Example 10 | | | | | | none | | | |
| Comparative Example 8 | | | | | | none | | | |

TABLE 5

| | Thickness ratio (B/A) | Melting peak temperature (A/B)(°C.) | Light interruptive property | Void ratio (%) | Lamination property | Forming property | Processing property |
|---|---|---|---|---|---|---|---|
| Example 5 | 20/5 | 228/228 | o | 8.5 | o | o | o |
| Example 6 | 20/5 | 228/228 | o | 9.4 | o | o | o |
| Example 7 | 20/5 | 228/228 | o | 11.0 | o | o | o |
| Example 8 | 25/0 | 228/— | Δ | 8.8 | o | o | Δ |
| Example 9 | 25/0 | 228/— | o | 12.0 | o | o | Δ |
| Comparative Example 6 | 20/5 | 228/221 | o | 9.6 | x | x | x |
| Comparative Example 7 | 20/5 | 228/221 | o | 10.1 | o | x | x |
| Example 10 | 25/0 | 228/— | o | 11.5 | o | o | o |
| Comparative Example 8 | 25/0 | 228/— | o | 8.5 | x | x | o |

TABLE 6

| | Extrusion temperature (°C.) | Longitudinal stretching | Transverse stretching | Heat treatment |
|---|---|---|---|---|
| Examples 1,2,4-10 Comparative Examples 1,4 & 8 | 280 | 102° C. 3.0 times | 110° C. 3.1 times | 190° C. 1.0% |
| Comparative Example 2 | 280 | 95° C. 3.0 times | 110° C. 3.1 times | 190° C. 1.0% |
| Comparative Example 3 | 280 | 102° C. 3.8 times | 110° C. 4.3 times | 180° C. 0% |
| Example 3 | 280 | 80° C. 3.0 times | 93° C. 3.1 times | 140° C. 1.0% |
| Comparative Example 5 | 280 | 40° C. 1.15 times | none | none |
| Example 6 | 280 | 105° C. 2.9 times | 115° C. 3.0 times | 200° C. 3.0% |
| Comparative Example 7 | 280 | 85° C. 4.1 times | 100° C. 4.1 times | none |

Although several preferred embodiments of the present invention have been described in detail herein, the invention is not limited thereto. It will be appreciated by those skilled in the art that various modifications may be made without materially departing from the novel and advantageous teachings of the invention. Accordingly, the embodiments disclosed herein are by way of example. It is to be understood that the scope of the invention is not to be limited thereby, but is to be determined by the claims which follow.

What is claimed is:

1. A polyester film for use of a laminate with a metal plate comprising a polyester-group resin containing a white pigment having a mean particle diameter of 0.01 to 1.8 μm at a content of 10 to 30% by weight, said film having (a) a void ratio of 4 to 30%, (b) a melting peak temperature of 150° to 245° C., (c) an amount of oligomer of not more than 3% by weight and (d) an orientation degree of 0.7 to 4.0.

2. The polyester film according to claim 1, wherein said white pigment comprises titanium oxide particles having a mean particle diameter of 0.1 to 1.2 μm and a loss on drying of not more than 0.8%.

3. The polyester film according to claim 2, wherein said titanium oxide particles are rutile type titanium oxide particles treated by a silane or an alcohol.

4. The polyester film according to claim 1, wherein the sum of an aliphatic acid component and an alcohol component whose carbon numbers are not less than 4 present in said polyester-group resin is not more than 5.0 mol %.

* * * * *

UNITED STATES PATENT AND TRADEMARK OFFICE
CERTIFICATE OF CORRECTION

PATENT NO. : 5,698,308
DATED : December 16, 1997
INVENTOR(S) : Takashi Sumiya, Iwao Tanaka, Kunio Shibatsuji, Hirokazu Kurome, Seiya Sugiura & Wataru Ooe It is certified that error appears in the above-indentified patent and that said Letters Patent is hereby corrected as shown below:

In Column 4, line 54, please change "$Sb_2O_1$" to --$Sb_2O_3$--.

In Column 10, in Table 3, column 9, row 21, please change "IPA:25" to --IPA:12--; and in Table 4, row 1, please change "Layer B" to --Layer A--.

Signed and Sealed this

Tenth Day of March, 1998

Attest:

BRUCE LEHMAN

Attesting Officer    Commissioner of Patents and Trademarks